United States Patent [19]
Daoud

[11] Patent Number: 5,975,945
[45] Date of Patent: Nov. 2, 1999

[54] ALL-PURPOSE NETWORK INTERFACE DEVICES USING CONVENTIONAL PLUG-IN PROTECTORS

[75] Inventor: Bassel H. Daoud, Parsippany, N.J.

[73] Assignee: Lucent Technologies Inc., Murray Hill, N.J.

[21] Appl. No.: 08/921,435

[22] Filed: Aug. 29, 1997

[51] Int. Cl.[6] .................................................. H01R 13/52
[52] U.S. Cl. ......................... 439/519; 439/936; 361/124
[58] Field of Search ................................ 439/519, 190, 439/521, 936; 379/399; 361/124

[56] References Cited

U.S. PATENT DOCUMENTS

| | | | |
|---|---|---|---|
| 4,215,381 | 7/1980 | Heisinger | 361/124 |
| 4,262,317 | 4/1981 | Baumbach | 361/124 |
| 4,434,449 | 2/1984 | Dickey | 361/124 |
| 4,502,088 | 2/1985 | Baumbach | 361/124 |
| 4,723,919 | 2/1988 | Crane | 439/521 |
| 5,153,910 | 10/1992 | Mickelson et al. | 379/399 |
| 5,195,125 | 3/1993 | Bliven et al. | 379/29 |
| 5,359,654 | 10/1994 | Jensen et al. | 379/397 |
| 5,427,547 | 6/1995 | Shimirak et al. | 439/521 |
| 5,562,491 | 10/1996 | Shimirak et al. | 439/521 |
| 5,595,504 | 1/1997 | Muller | 439/521 |
| 5,796,039 | 8/1998 | Daoud | 439/936 |

*Primary Examiner*—Steven L. Stephan
*Assistant Examiner*—Hae Moon Hyeon

[57] ABSTRACT

A network interface device (NID) provides an electrical interface between a cable and a local network (e.g., a number of telephones) of a telecommunications system. According to one embodiment of the present invention, high voltage/current electrical isolation is provided by conventional 5-pin plug-in protector that get inserted within the modular NID to form electrical connections, via a printed wiring board, with both cable-side and network-side interfaces. The plug-in protectors are inserted into a bath of gel that gets displaced and surrounds the seams of the protector, forming a water-resistant seal that inhibits moisture from entering the protector and adversely affecting protector operations. As such, NIDs of the present invention can be configured with plug-in protectors for outdoor applications, even though, under conventional NID specifications, plug-in protectors are limited to indoor applications and special potted protectors are required for outdoor use.

12 Claims, 4 Drawing Sheets

ALL-PURPOSE NETWORK INTERFACE DEVICES USING CONVENTIONAL PLUG-IN PROTECTORS

BACKGROUND OF THE INVENTION

FIELD OF THE INVENTION

The present invention relates to a network interface device that provides the electrical interface between a cable and a local network of a telecommunications system.

DESCRIPTION OF THE RELATED ART

A network interface device (NID) is an enclosure housing hardware that forms the electrical interface between a cable and a local network of a telecommunications system. For example, an NID can be used to provide the electrical interface between a multi-wire telephone cable and the various telephones of an office building. An NID may also be used with telecommunications systems carrying signals other than just telephone voice signals.

An NID provides two main functions: (1) it provides connections between a cable and the individual nodes (e.g., telephones) of a local network; and (2) it provides electrical isolation between the cable and the local network. Electrical isolation is intended to prevent any high voltages and/or high currents that may exist from time to time in the cable from reaching the local network. For example, an NID is designed to protect telephone users from lightning striking a telephone cable. Such electrical isolation is typically provided by protectors that quickly connect signals to ground upon detection of sufficiently high voltages or currents.

An NID may be located either inside or outside of a building. When located inside of a building, conventional indoor 5-pin plug-in protectors can be used to provide the high-voltage/high-current electrical isolation function. According to the prior art, when an NID is to be located outside of a building, special potted protectors are used. This is because a conventional plug-in protector has seams through which moisture can pass, thereby adversely affecting the operations of the protector. The potting in the special protectors keeps moisture from entering the protector. Unfortunately, potted protectors are more expensive than conventional plug-in protectors.

SUMMARY OF THE INVENTION

The present invention is directed to a network interface device that can be used for either indoor or outdoor applications, yet relies on conventional plug-in protectors, such as 5-pin plug-in protectors, whose use has been previously limited to indoor applications. The NIDs of the present invention have a well-shaped housing within which a gel can be placed. When one or more plug-in protectors are inserted into the housing, the gel surrounds the open seams in the plug-in protectors, thereby inhibiting moisture from entering the protector which can adversely affect the protector operations. For NIDs that have modular plug/jack combinations, the gel can also be placed within the modular jacks to reduce the adverse effects that moisture can have on the electrical connections between the modular jacks and inserted modular plugs. In this way, NIDs according to the present invention can use conventional plug-in protectors rather than the relatively expensive potted protectors currently used in NIDs designed for outdoor applications.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
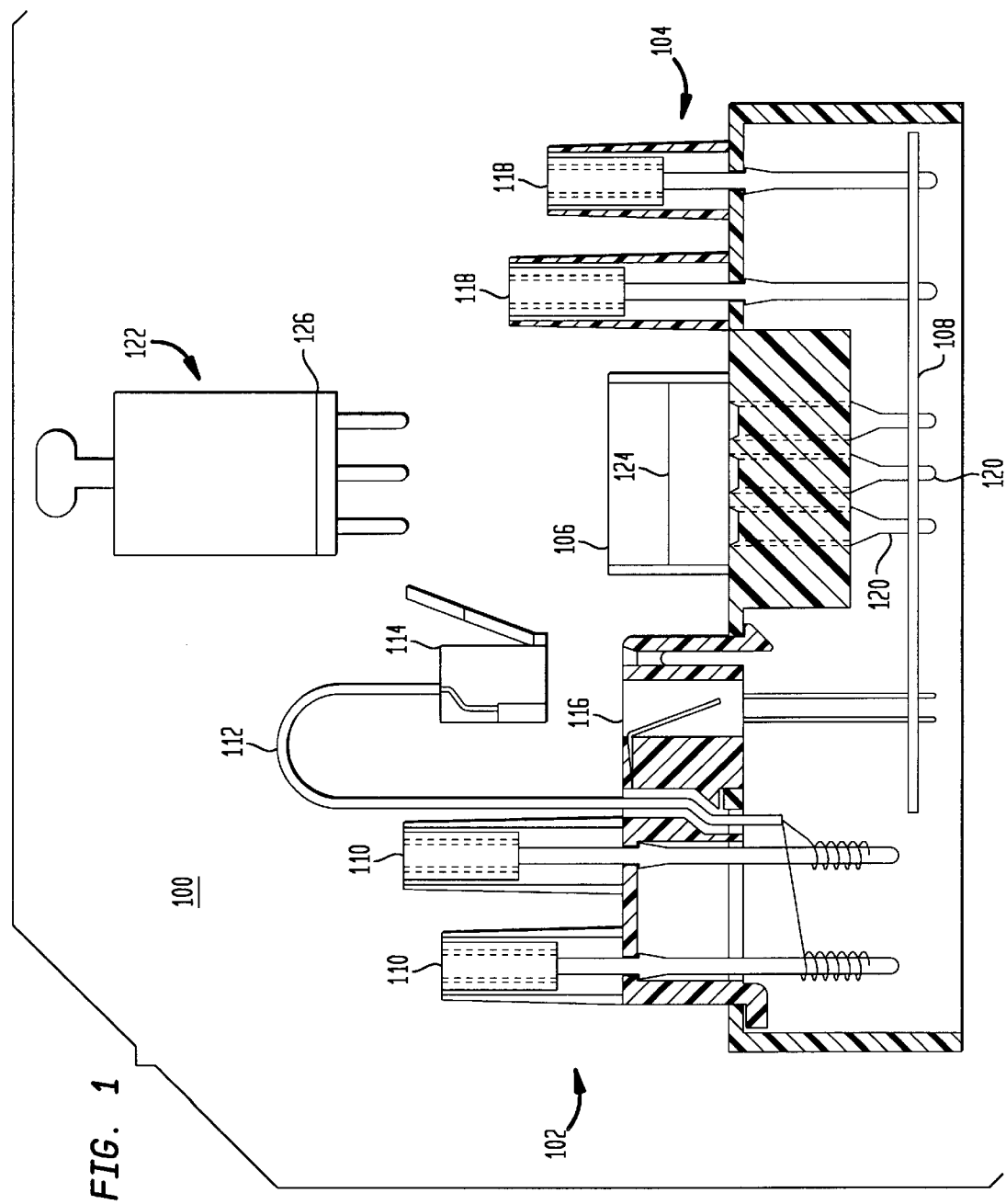
FIGS. 1 and 2 show a cross-sectional side view and a top view, respectively, of a network interface device, according to one embodiment of the present invention.
Figure 2:
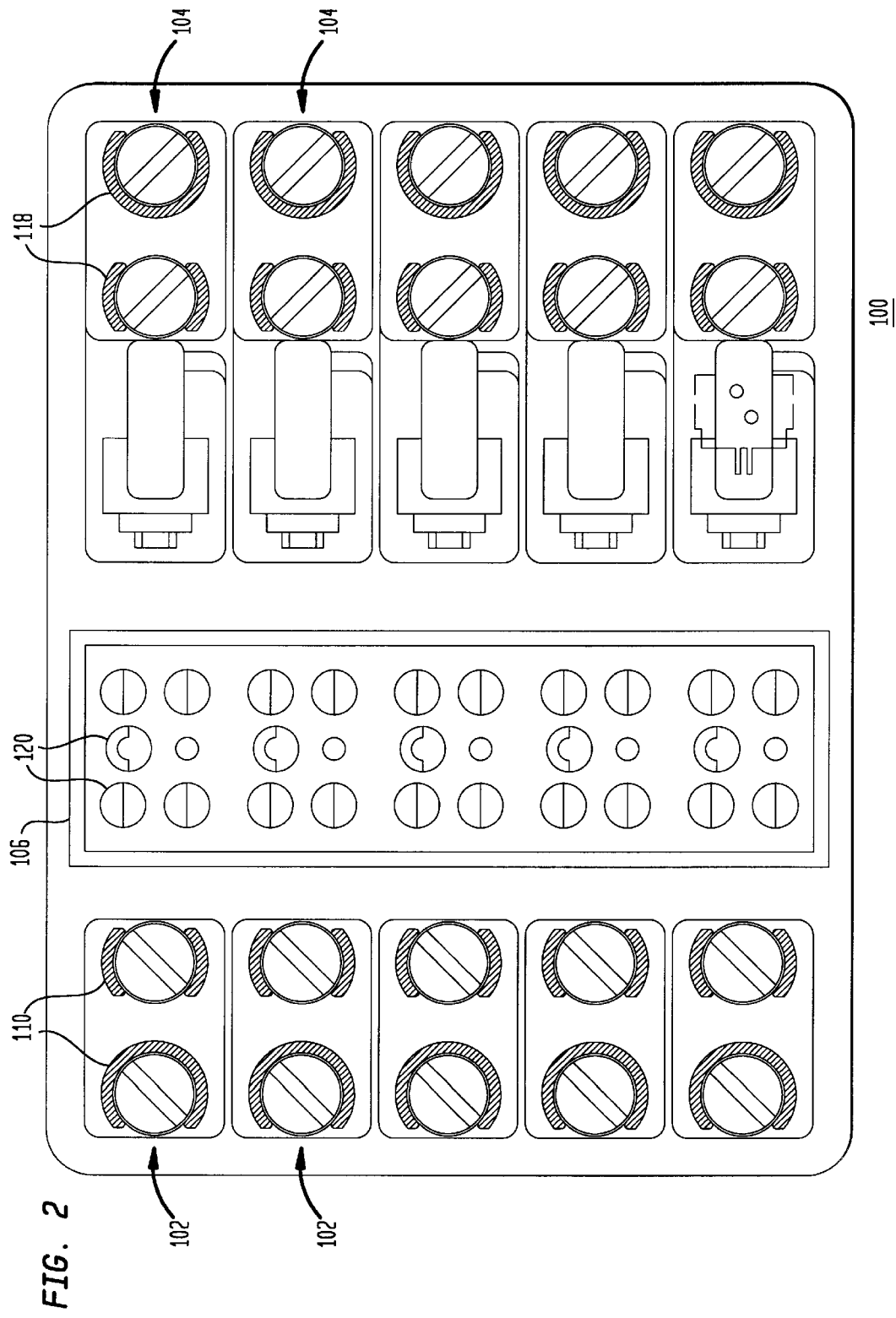

FIGS. 1 and 2 show a cross-sectional side view and a top view, respectively, of a network interface device 100, according to one embodiment of the present invention. NID 100 is designed to provide the electrical interface between up to five nodes (e.g., telephones) of a local network and a multi-wire cable. NID 100 is a single modular assembly comprising an array of network-side interfaces 102, an array of cable-side interfaces 104, a well-shaped gel housing 106, and a printed wiring board (PWB) 108. Each network-side interface 102 is adapted to be connected to a twisted pair leading to a telephone, and each cable-side interface 104 is adapted to be connected to a twisted pair of the multi-wire cable.

Each network-side interface 102 comprises (a) two screw-type connectors 110 electrically connected through a modular plug cord 112 to a modular plug 114 and (b) a modular jack 116 adapted to receive modular plug 114. The tails of modular jack 116 are electrically connected to printed wiring board 108. Similarly, each cable-side interface 104 comprises two screw-type connectors 118 electrically connected directly to PWB 108.

Gel housing 106 has a field of sockets 120, electrically connected to PWB 108 and designed to receive simultaneously up to five conventional 5-pin plug-in protectors 122 to provide high voltage/high-current electrical isolation between the cable and the five nodes of the local network. When NID 100 is to be used in an outdoor setting or other environment having adverse conditions (e.g., high humidity), a gel may be placed within gel housing 106 to form a gel bath 124. When a plug-in protector 122 is inserted into gel housing 106, the gel gets displaced and surrounds the open seam 126 in plug-in protector 122, thereby inhibiting moisture from entering and adversely affecting the operations of the plug-in protector. Similarly, gel can be placed within each modular jack 116 to inhibit moisture from adversely affecting the electrical connections between modular plug 114 and modular jack 116. When used for indoor or other benign (e.g., low humidity) environments, NID 100 can be used without gel.

A suitable gel is one that will remain within gel housing 106 and modular jacks 116 even when NID 100 is mounted sideways or even upside down. In addition, the gel should remain flexible and form a water-resistant seal over the seams of inserted plug-in protectors, yet not interfere with the electrical connections between, for example, the prongs of the plug-in protectors and the sockets in gel housing 106. Suitable gels for use in NID 100 include Term Lug Cap Sealant brand gel sold by Raychem of Fuguay-Varina, N.C., and 2000 or 2003 Silicone Sealant brand gel sold by 3M of Austin, Tex.

Figure 3B:
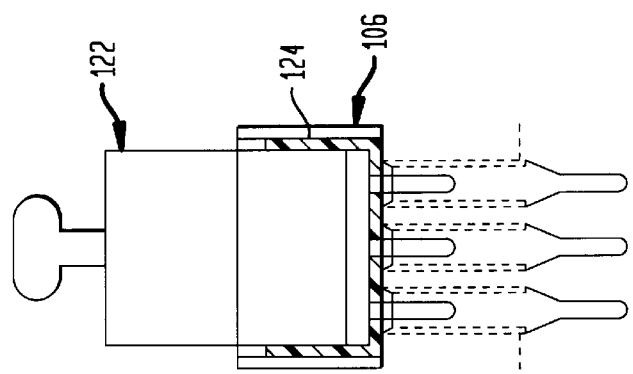
FIGS. 3(a)–(b) show cross-sectional side views of a plug-in protector and the gel housing of the NID of FIG. 1, before and after the protector is inserted within the gel housing, respectively.
Figure 3A:
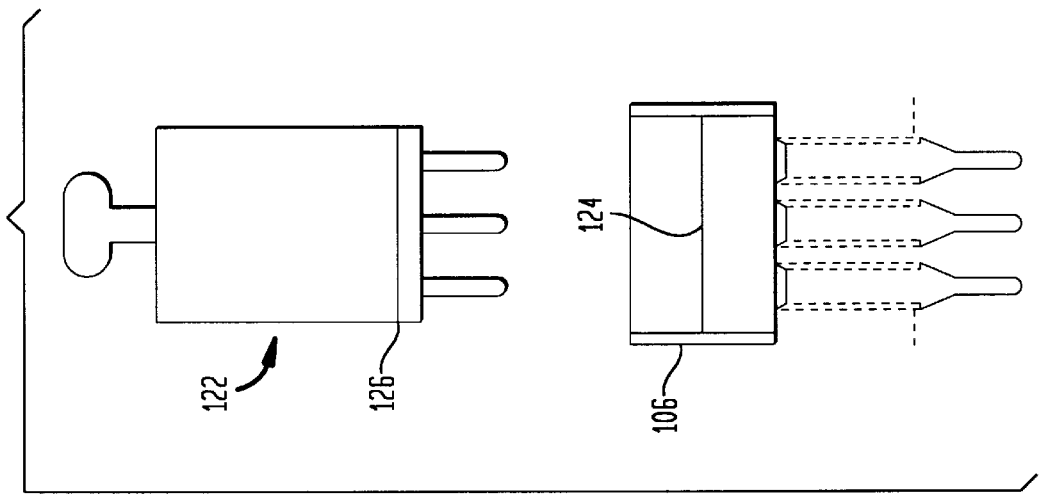

FIGS. 3(a)–(b) show cross-sectional side views of a plug-in protector 122 and gel housing 106 of NID 100 of FIG. 1, before and after the protector is inserted within the gel housing, respectively. As shown, when protector 122 is inserted within gel housing 106, the gel in gel bath 124 gets displaced and surrounds seam 126 in protector 122, to form a seal that inhibits moisture from entering the protector through the seam.

Figure 4:
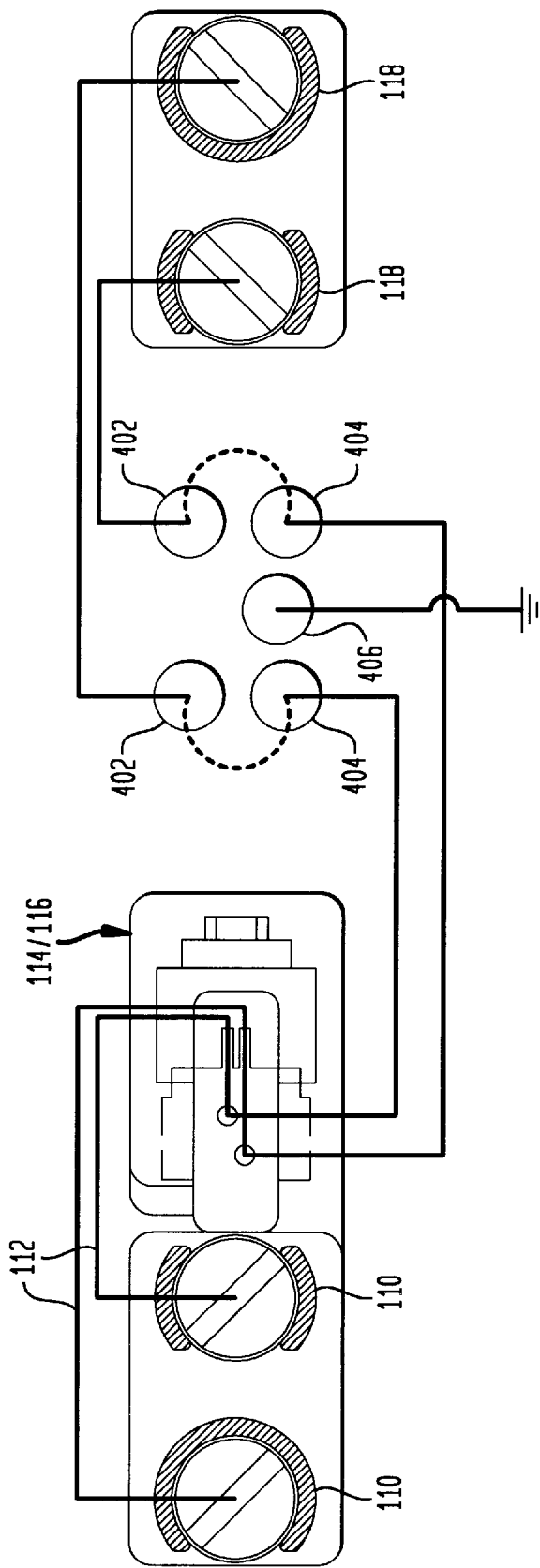
FIG. 4 shows a schematic wiring diagram for one of the electrical interface paths provided by the NID of FIG. 1.

FIG. 4 shows a schematic wiring diagram for one of the electrical interface paths provided by NID 100 of FIG. 1. From cable to network, the electrical path flows from cable-side connectors 118 to the cable-side pins 402 of a plug-in protector to the network-side pins 404 of the protector to the configured modular plug/jack assembly 114/116 through cord 112 to network-side connectors 100. In the event of sufficiently high voltage and/or current appearing at cable-side pins 402, the electrical signal will be terminated to grounded pin 406.

Although the present invention has been shown in an embodiment that provides up to five electrical interface paths, it will be understood that the present invention can be implemented as a network interface device for any number of paths, including a single path.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A network interface device (NID), adapted to provide an electrical interface between a cable and a local network of a telecommunications system, comprising:
   (a) one or more cable-side interfaces, each adapted to be connected to wires from the cable;
   (b) one or more network-side interfaces, each adapted to be connected to wires from the local network; and
   (c) an open gel housing, adapted to receive a gel and one or more 5-pin plug-in protectors adapted to provide high-voltage/high-current electrical isolation between the cable and the local network, wherein, when a 5-pin plug-in protector is inserted into the gel housing, the gel surrounds one or more seams in the 5-pin plug-in protector to inhibit moisture from adversely affecting operations of the 5-pin plug-in protector, thereby enabling the NID to be configured with a 5-pin plug-in protector designed for indoor use independent of whether the NID is to be used in an indoor application or an outdoor application, wherein the open gel housing is defined by walls surrounding a surface having one or more sockets configured to receive the one or more 5-pin-in plug protectors, the gel housing being open at the top of the walls to receive both the gel and the one or more 5-pin plug-in protectors, such that, when the gel housing receives the gel before receiving the one or more 5-pin plug-in protectors, the gel fills at least part of an interstitial volume between the outer surfaces of the one or more 5-pin plug-in protectors and the inner surfaces of the walls, with the interstitial volume remaining open at the top of the gel housing after insertion of the one or more 5-pin plug-in protectors.

2. The invention of claim 1, wherein the NID has a single modular design.

3. The invention of claim 1, wherein each cable-side interface and each network-side interface comprises two or more screw-type connectors.

4. The invention of claim 3, wherein each network-side interface further comprises a modular plug connected to the corresponding screw-type connectors and a modular jack, wherein:
   the modular plug is inserted into the modular jack to connect the network-side interface to the 5-pin plug-in protector; and
   the modular plug is removed from the modular jack to enable testing of the electrical interface.

5. The invention of claim 4, wherein additional gel is added to the modular jack to inhibit moisture from adversely affecting electrical connections between the modular plug and the modular jack.

6. The invention of claim 1, further comprising a printed wiring board adapted to provide electrical connections between the cable-side interfaces and the 5-pin plug-in protectors and between the 5-pin plug-in protectors and the network-side interfaces.

7. The invention of claim 1, further comprising a printed wiring board adapted to provide electrical connections between the cable-side interfaces and the 5-pin plug-in protectors and between the 5-pin plug-in protectors and the network-side interfaces, wherein:
   the NID has a single modular design;
   each cable-side interface and each network-side interface comprises two or more screw-type connectors; and
   each network-side interface further comprises a modular plug connected to the corresponding screw-type connectors and a modular jack, wherein:
      the modular plug is inserted into the modular jack to connect the network-side interface to the 5-pin plug-in protector; and
      the modular plug is removed from the modular jack to enable testing of the electrical interface.

8. The invention of claim 7, wherein additional gel is added to the modular jack to inhibit moisture from adversely affecting electrical connections between the modular plug and the modular jack.

9. A network interface device (NID), adapted to provide an electrical interface between a cable and a local network of a telecommunications system,
   (a) one or more cable-side interfaces, each adapted to be connected to wires from the cable;
   (b) one or more network-side interfaces, each adapted to be connected to wires from the local network;
   (c) means for receiving one or more 5-pin plug-in protectors adapted to provide high-voltage/high-current electrical isolation between the cable and the local network; and
   (d) a printed wiring board adapted to provide electrical connections between the cable-side interfaces and the 5-pin plug-in protectors and between the 5-pin plug-in protectors and the network-side interfaces, wherein the receiving means comprises an open gel housing, adapted to receive a gel, wherein, when a 5-pin plug-in protector is inserted into the gel housing, the gel surrounds one or more seams in the 5-pin plug-in protector to inhibit moisture from adversely affecting operations of the 5-pin plug-in protector, thereby enabling the NID to be configured with a 5-pin plug-in protector designed for indoor use independent of whether the NID is to be used in an indoor application or an outdoor application, wherein the open gel housing is defined by walls surrounding a surface having one or more sockets configured to receive the one or more 5-pin plug-in protectors, the gel housing being open at the top of the walls to receive both the gel and the one or more 5-pin plug-in protectors, such that, when the gel housing receives the gel before receiving the one or more 5-pin plug-in protectors, the gel fills at least part of an interstitial volume between the outer surfaces of the one or more 5-pin plug-in protectors and the inner surfaces of the walls, with the interstitial volume remaining open at the top of the gel housing after insertion of the one or more 5-pin plug-in protectors.

10. The invention of claim 9, wherein the NID has a single modular design.

11. The invention of claim 9, wherein each cable-side interface and each network-side interface comprises two or more screw-type connectors.

12. The invention of claim 11, wherein each network-side interface further comprises a modular plug connected to the corresponding screw-type connects and a modular jack, wherein:

the modular plug is inserted into the modular jack to connect the network-side interface to the 5-pin plug-in protector; and the modular plug is removed from the modular jack to enable testing of the electrical interface.

* * * * *